(12) United States Patent
Lutz et al.

(10) Patent No.: US 11,945,262 B2
(45) Date of Patent: Apr. 2, 2024

(54) UTILITY VEHICLE TYRES

(71) Applicant: Continental Reifen Deutschland GmbH, Hannover (DE)

(72) Inventors: Andre Lutz, Hannover (DE); Florian Kristen, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 121 days.

(21) Appl. No.: 16/758,946

(22) PCT Filed: Jul. 30, 2018

(86) PCT No.: PCT/EP2018/070527
§ 371 (c)(1),
(2) Date: Apr. 24, 2020

(87) PCT Pub. No.: WO2019/086153
PCT Pub. Date: May 9, 2019

(65) Prior Publication Data
US 2021/0178826 A1 Jun. 17, 2021

(30) Foreign Application Priority Data
Nov. 3, 2017 (DE) .................... 10 2017 219 532.0

(51) Int. Cl.
*B60C 11/03* (2006.01)
*B60C 11/13* (2006.01)
*B60C 11/04* (2006.01)

(52) U.S. Cl.
CPC ...... *B60C 11/0309* (2013.01); *B60C 11/1315* (2013.01); *B60C 2011/0341* (2013.01);
(Continued)

(58) Field of Classification Search
CPC ............. B60C 11/1353; B60C 11/1315; B60C 11/0309; B60C 11/1361; B60C 11/047
See application file for complete search history.

(56) References Cited

U.S. PATENT DOCUMENTS

| 4,345,632 A | 8/1982 | Takigawa et al. |
| 6,142,200 A * | 11/2000 | Feider ................. B60C 11/0309 |
| | | 152/DIG. 3 |

(Continued)

FOREIGN PATENT DOCUMENTS

| CN | 102548776 A | 7/2012 |
| CN | 104582981 A | 4/2015 |

(Continued)

OTHER PUBLICATIONS

Kiwaki, English Machine Translation of JP 2012183962, 2012 (Year: 2012).*

(Continued)

*Primary Examiner* — Justin R Fischer
*Assistant Examiner* — Brendon Charles Darby
(74) *Attorney, Agent, or Firm* — Richard A. Wolf; Gregory J. Adams

(57) ABSTRACT

The invention relates to a utility vehicle tire tyre having a tread with at least one circumferential channel (2, 2', 2") with a channel base (5) and channel walls (4, 4').
Base elevations are formed on the channel base. A top surface (8, 8', 8") of the base elevations (7, 7', 7") slopes downward uniformly toward the surface edge, wherein the channel walls (4, 4') have, to the side of the base elevations (7, 7', 7"), wall sections (4b, 4'b) which are convexly curved toward one another.

13 Claims, 4 Drawing Sheets

Figure 9A:
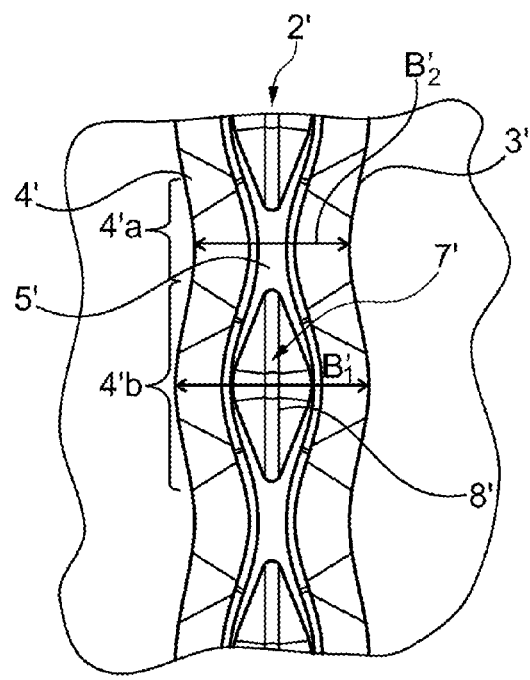

(52) U.S. Cl.
CPC ..... *B60C 11/047* (2013.01); *B60C 2011/1338* (2013.01); *B60C 2011/1361* (2013.01)

(56) References Cited

U.S. PATENT DOCUMENTS

| | | | |
|---|---|---|---|
| 2010/0212793 A1* | 8/2010 | Kaji | B60C 11/047 152/209.18 |
| 2012/0018068 A1 | 1/2012 | Kiwaki et al. | |
| 2013/0000806 A1 | 1/2013 | Sugiyasu | |
| 2013/0098520 A1 | 4/2013 | Kato | |
| 2018/0170116 A1 | 6/2018 | Daries | |

FOREIGN PATENT DOCUMENTS

| | | | | |
|---|---|---|---|---|
| DE | 3727050 A | * | 2/1989 | ........... B60C 11/042 |
| DE | 3727050 A1 | | 2/1989 | |
| EP | 3100873 A1 | | 12/2016 | |
| JP | S6325107 A | | 2/1988 | |
| JP | 2004155382 A | * | 6/2004 | ........... B60C 11/047 |
| JP | 2011168223 A | * | 9/2011 | |
| JP | 2011168223 A | | 9/2011 | |
| JP | 2012183962 A | * | 9/2012 | |
| JP | 2012183962 A | | 9/2012 | |
| WO | WO-2010049959 A1 | * | 5/2010 | ........... B60C 11/042 |
| WO | 2017025212 A1 | | 2/2017 | |

OTHER PUBLICATIONS

Suda, English Machine Translation of JP 2004155382, 2004 (Year: 2004).*
International Search Report dated Oct. 1, 2018 of International application PCT/EP2018/070527 on which this application is based.
Chinese Office Action dated Mar. 23, 2022 corresponding to Chinese Patent Application No. 201880069868.3.

\* cited by examiner

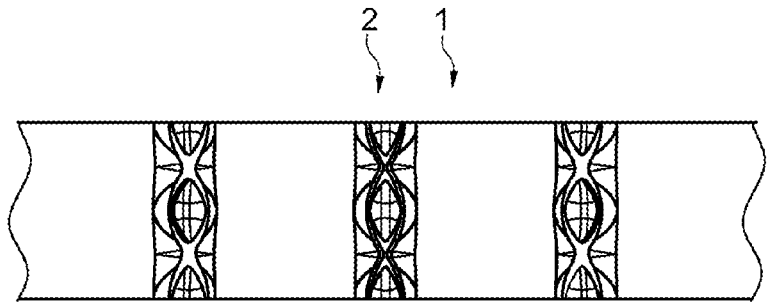
Fig. 1
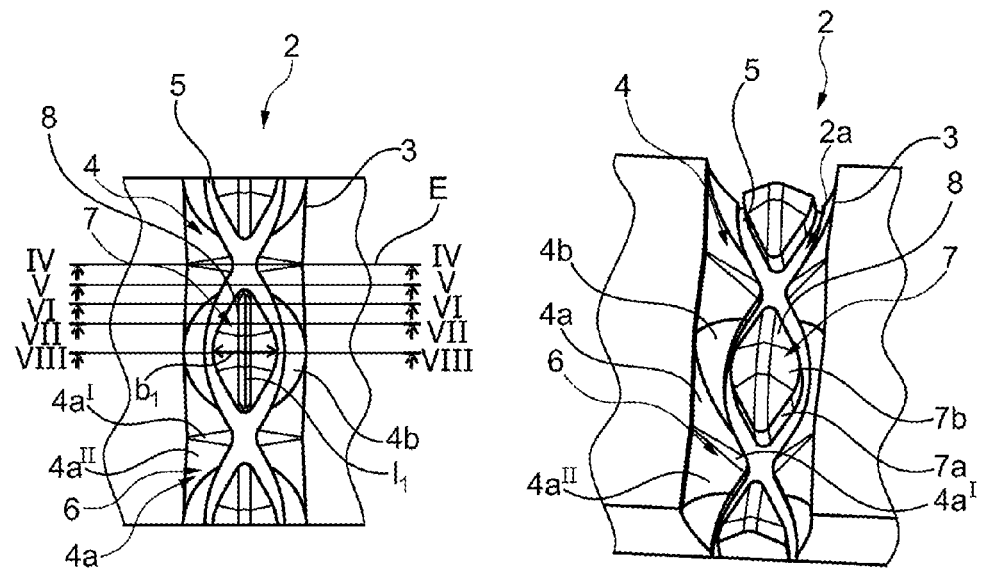
Fig. 2
Fig. 3
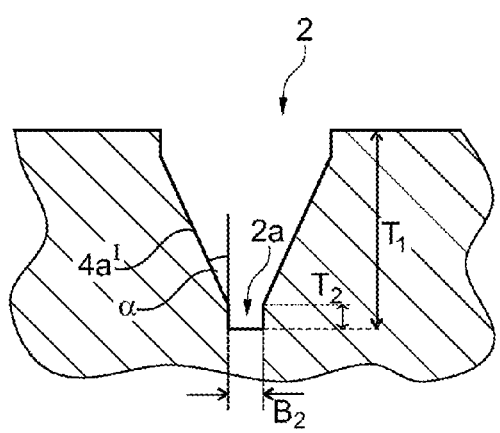
Fig. 4: Section IV - IV

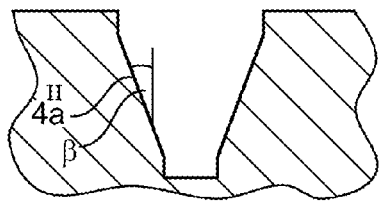
Fig. 5: Section V - V
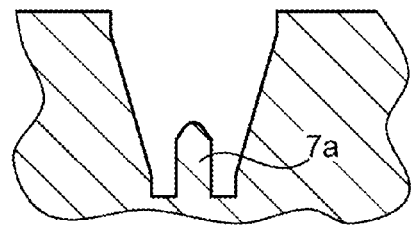
Fig. 6: VI - VI
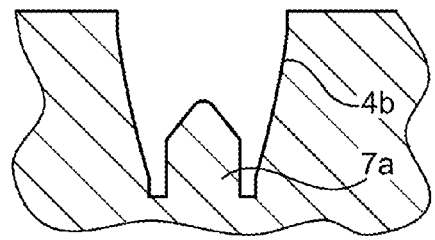
Fig. 7: VII - VII
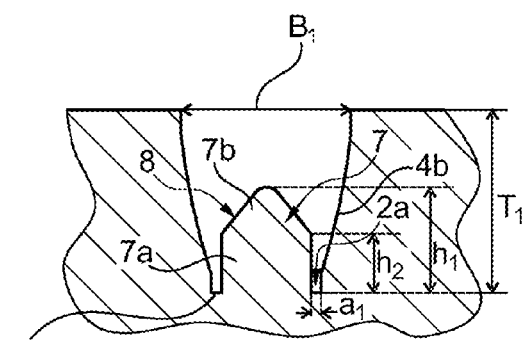
Fig. 8: VIII - VIII

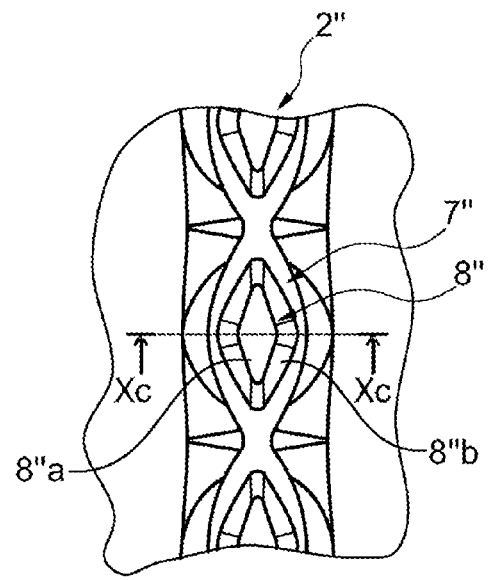
Fig. 10a
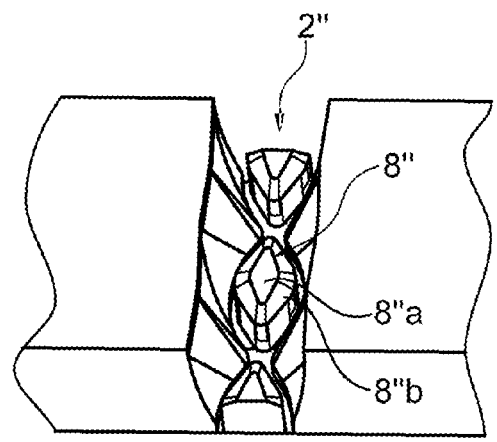
Fig. 10b
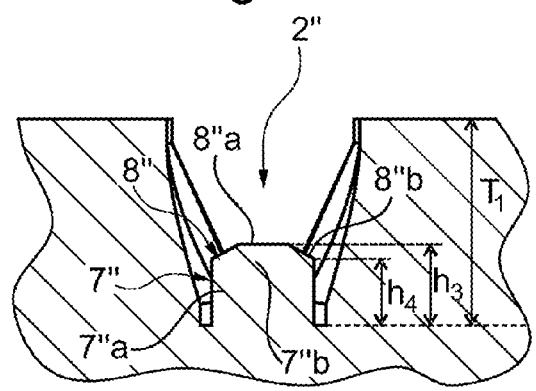
Fig. 10c: Xc-Xc

UTILITY VEHICLE TYRES

The invention relates to a utility vehicle tyre having a tread with at least one circumferential channel with a channel base and channel walls, wherein base elevations are formed on the channel base in a manner distributed over the circumference and acting centrally as stone ejectors, with a height of 25% to 60% of the profile depth and a greater extent in the circumferential direction than in the axial direction, which base elevations either contact the channel walls or are at distances of up to 4.0 mm therefrom in the axial direction and are bounded in the radial direction by a top surface having an encircling surface edge, wherein the channel walls between the base elevations have wall portions which converge toward each other.

A utility vehicle tyre of said type is known for example from JP S6 325 107 A. The tread of said utility vehicle tyre is provided with a central circumferential channel, on the channel base of which base elevations acting as stone ejectors are formed. The base elevations in a plan view are in the form of hexagons elongated in the circumferential direction, and are bounded in the radial direction by flat top surfaces which are oriented substantially parallel to the tread periphery. The base elevations have a width of 25% to 40% of the profile depth in the axial direction and a height of 20% to 60% of the profile depth in the radial direction. Between the base elevations, projections which are trapezoidal in a plan view and which have a height of 20% to 60% of the profile depth in the radial direction are formed on channel walls.

U.S. Pat. No. 4,345,632 A discloses a utility vehicle tyre having a tread which has a circumferential channel which runs in a zigzag-shaped manner in a plan view and on the channel base of which base elevations which are spaced apart from the channel walls are formed as stone ejectors. The base elevations have a height of 20% to 60% of the profile depth and a length of, for example, 6.0 mm in the circumferential direction.

DE 37 27 050 A1 discloses a further utility vehicle tyre having a tread with a circumferential channel which runs in a zigzag-shaped manner in a plan view with base elevations acting as stone ejectors on the channel base. The base elevations have, for example, an extent length of 4.0 mm in the circumferential direction. Further base elevations of web-like configuration run between said base elevations.

The base elevations which are known from the prior art and act as stone ejectors have configurations and dimensions which have proven not very suitable for reliably ejecting relatively large stones because of a lack of stability. The stones consequently jammed in the channels can cause undesirable damage to the channel walls and the stone ejectors.

The invention is therefore based on the object, in a utility vehicle tyre of the type mentioned at the beginning, of improving the effectiveness of the base elevations acting as stone ejectors to reliably eject relatively large stones.

The stated object is achieved according to the invention in that the top surface of the base elevations slopes downward uniformly toward the surface edge, wherein the channel walls have, to the side of the base elevations, wall sections which are convexly curved toward one another in a plan view, and wherein the surface edge of the top surface follows the profile of the wall sections which are convexly curved toward one another, such that the width of the base elevations decreases toward those ends thereof which lie in the circumferential direction.

In the invention, the stone ejectors are components of a channel concept or are coordinated with the configuration of the channel walls. The adaptation of the configuration of the base elevations to the wall sections of the channel walls, which wall sections are curved convexly toward one another, particularly significantly increases the stability of the base elevations and thereby the capability thereof of being able to effectively eject even relatively large stones. The top surfaces of the base elevations sloping down toward the channel base "distribute" the forces acting on the base elevations from the trapped stones, and thereby reduce the risk of jamming of the stones and protect the base elevations and also the channel walls and the channel base from damage due to stones penetrating the channel. In addition, the curved wall sections of the channel walls have a supporting, stabilizing effect on the channel walls in the region of the base elevations and also contribute to improving the effect of the base elevations.

According to a preferred design variant, the base elevations in a plan view have the form of diamonds which are elongated in the circumferential direction and have rounded corners. Such base elevations interact with the convexly curved wall sections of the channel walls in such a manner that the stone-ejecting effect is additionally improved. The base elevations are furthermore particularly stable because of the diamond shape.

According to a preferred design variant, the base elevations are composed of a base part with a height which is constant in the radial direction and of a dome-like upper part placed onto said base part. It is preferred here if the height of the base part of the base elevations is 35% to 90%, in particular 40% to 80%, of the height of the base elevations. Such a base part increases the stability of the base elevation.

Furthermore, it is preferred if the top surface of the base elevations has a core top surface and an edge top surface which runs around the latter and slopes downward toward the surface edge of the top surface, in order to avoid jamming of stones.

According to a preferred further design variant, the base elevations are bounded exclusively by their top surfaces. The stability of the base elevations can likewise be increased in this manner. Such base elevations are preferably in the form of a hemi-ellipsoid or of a subsection of a hemi-ellipsoid. By means of the completely rounded top surfaces of such ellipsoids, firstly jamming of stones is very effectively prevented and secondly the base elevations are particularly resistant to possible damage due to stones.

The channel walls have a particularly pronounced supporting effect if the wall sections of the channel walls, which wall sections are curved convexly toward one other in a plan view, are curved convexly at least over the majority of their radial extent, as viewed in cross section.

The base elevations are particularly stable if, according to a further preferred variant, they have in the circumferential direction at their longest point an extent length of 10.0 mm to 35.0 mm, in particular of 15.0 mm to 25.0 mm. Such base elevations are significantly larger and more stable than conventionally designed "stone ejectors".

According to a preferred further design variant, the height of the base elevations amounts to 25% to 60%, in particular 30% to 55%, preferably at most 50%, of the profile depth. This measure likewise contributes to the stability of the base elevations and, in particular via an advantageous interaction with the curved wall sections, improves the stone-ejecting effect.

In this connection, it is furthermore of advantage if the base elevations have a width of 5.0 mm to 15.0 mm in the axial direction at their widest point.

According to a preferred further variant, it is provided that a channel path of the circumferential channel runs between the wall sections, which converge toward one another between the base elevations, said channel path at its narrowest point having a width of 15% to 45%, in particular of at most 35%, of the width of the circumferential channel at the tread periphery. By means of such channel paths, in particular the water-draining properties in the circumferential channels are advantageously influenced.

Furthermore, it is preferred if the wall sections which converge toward one another between the base elevations bound projections which project into the circumferential channel, lie opposite one another in pairs and are in particular of lug-like configuration. Such projections as a component of the channel concept mentioned improve firstly themselves and secondly, by interaction with the base elevations, the stone-ejecting effect. In addition, the projections also have a supporting, stabilizing effect on the channel walls in the region of the base elevations.

According to a further preferred design variant, the wall sections which converge toward one another between the base elevations are at a distance of 2.0 mm to 4.0 mm at their radially inner ends. This is of advantage in particular in respect of the water-draining properties of the circumferential channel.

According to a further preferred design variant, the channel walls of the circumferential channel are wave-shaped in a plan view and run symmetrically with respect to a plane defined by the circumferential direction and the radial direction. This variant provides a further particularly advantageous channel concept with stone ejectors.

Figure 9B:
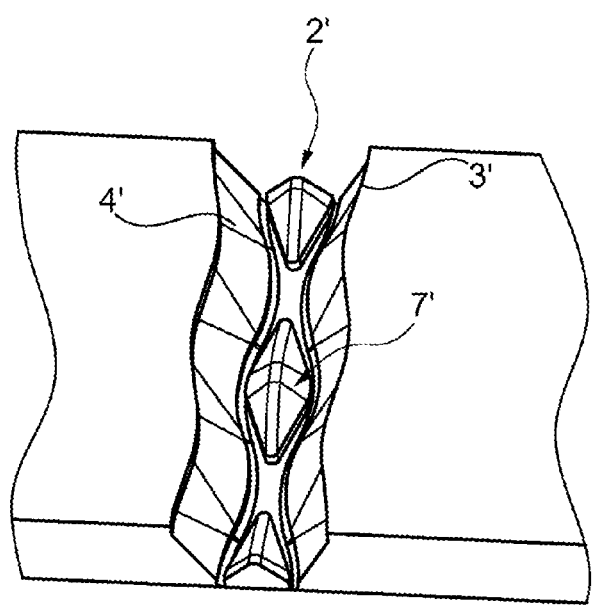

Further features, advantages and details of the invention will now be described in more detail on the basis of the drawing, which schematically shows exemplary embodiments of the invention. In the drawing, FIG. 1 shows a plan view of a central circumferential section of a tread of a utility vehicle tyre with a first design variant of the invention, FIG. 2 shows an enlarged plan view of a circumferential section of a circumferential channel of the tread from FIG. 1, FIG. 3 shows an oblique view of the circumferential section from FIG. 2, FIG. 4 shows a section along the line IV-IV in FIG. 2.
FIG. 5 shows a section along the line V-V of FIG. 2.
FIG. 6 shows a section along the line VI-VI in FIG. 2,
FIG. 7 shows a section along the line VII-VII in FIG. 2,
FIG. 8 shows a section along the line VIII-VIII in FIG. 2,
FIG. 9a shows a plan view of a circumferential section of a circumferential channel of a tread with a second design variant of the invention, FIG. 9b shows an oblique view of the circumferential section from FIG. 9a, FIG. 10a shows a plan view of a circumferential section of a circumferential channel of a tread with a third design variant of the invention, FIG. 10b shows an oblique view of the circumferential section from FIG. 10a, and FIG. 10c shows a section along the line Xc-Xc in FIG. 10a.

Utility vehicle tyres designed according to the invention are tyres of radial design, in particular for construction site vehicles, trucks or buses.

The central circumferential section of a tread that is shown in FIG. 1 has four profile positives 1 which encircle in the circumferential direction, are illustrated schematically and in simplified form and are in particular profile bands or profile block rows realized in a known manner. Profile positives 1 which are adjacent in the axial direction are separated by a respective circumferential channel 2 running rectilinearly in a plan view.

In the exemplary embodiment shown, the circumferential channels 2 are designed in a corresponding manner. The configuration of the circumferential channels 2 will be described below with reference to the circumferential channel 2 shown in FIG. 2 to FIG. 8.

As FIG. 2 and FIG. 3 show, the circumferential channel 2 at the tread periphery is bounded by two channel edges 3, which run substantially in the circumferential direction and, in the exemplary embodiment shown, have a slightly wave-shaped profile in a plan view, and furthermore by channel walls 4 adjoining the channel edges 3, and a channel base 5. The circumferential channel 2, at its deepest point in the radial direction, has the profile depth $T_1$ (FIG. 4, FIG. 8) that is provided for the respective utility vehicle tyre of 12.0 mm to 26.0 mm and, at the tread periphery, at its widest point in the axial direction, a width $B_1$ (FIG. 8) of in particular 10.0 mm to 25.0 mm. According to FIG. 4 to FIG. 8, the channel walls 4, in the exemplary embodiment shown, have radially outer sections running in the radial direction, as viewed in cross section, between which the circumferential channel 2 likewise has the width $B_1$.

Each channel wall 4 bounds and forms a multiplicity of flat lug-like projections 6 which follow one another in the circumferential direction and are arranged at regular intervals over the entire extent of the circumferential channel 2, wherein each projection 6 is bounded by a wall section 4a of the respective channel wall 4. The projections 6 bounded by wall sections 4a at the two channel walls 4 lie opposite one another in pairs and are formed symmetrically with respect to a plane which is defined by the circumferential direction and the radial direction and runs through the center of the circumferential channel 2.

Each projection 6 is additionally formed symmetrically with respect to a plane which is defined by the radial direction and the axial direction, runs through the center of the projection 6 and runs along the intersecting line IV-IV shown in FIG. 2. The wall sections 4a bounding the projections 6 are composed of a slightly outwardly curved central wall region $4a^I$ forming the lug back and two lateral wall regions $4a^{II}$ which adjoin said central wall region and form the lug wings. The central wall region $4a^I$ of the wall section 4a runs in the plane mentioned, which coincides with the intersecting line IV-IV, at an angle α (FIG. 4) of 10° to 30° to the radial direction, as viewed in cross section. The lateral wall regions $4a^{II}$ of the wall section 4a are preferably flat surfaces which are inclined with respect to the circumferential direction (FIG. 3) and, as viewed in cross section, run at an angle β (FIG. 5) of, for example, 5° to 25° to the radial direction, wherein β<α.

Wall sections 4b which are sickle-shaped in a plan view run between the projections 6 which are formed on the same channel wall 4 and directly follow one another in the circumferential direction. The sickle-shaped wall sections 4b belonging to a channel wall 4 are curved convexly in a plan view with respect to the sickle-shaped wall sections 4b belonging in each case to the opposite channel wall 4. In accordance with their sickle shape, the wall sections 4b peter out along the lateral wall regions $4a^{II}$ forming the lug wings.

Furthermore, the wall sections 4b, as viewed in cross section, are slightly bent, and therefore the wall sections 4b belonging to the different channel walls 4 are also curved slightly convexly toward one another in cross section (FIG. 7, FIG. 8).

In each intermediate space which is located between opposite wall sections 4b that are curved convexly toward one another, a base elevation 7 acting as a stone ejector is formed centrally on the channel base 5 of the circumferential channel 2. Each base elevation 7 is therefore located between two pairs of opposite projections 6 directly following one another in the circumferential direction. In a plan view, each base elevation 7 is in the form of a diamond which is elongated in the circumferential direction and has rounded corners, in particular substantially in the form of a football. Remaining on the channel base 5 of the circumferential channel 2 is a channel path 2a (FIG. 3) which encircles all of the base elevations 7 and, in a plan view, extends substantially along two intersecting shafts which have a coinciding wavelength and are phase-displaced with respect to one another by half of the wavelength in the circumferential direction.

The channel path 2a has a depth $T_2$ (FIG. 4) of up to 4.0 mm, in particular of up to 3.0 mm, in the radial direction between the central wall regions $4a^I$ of mutually opposite projections 6. Furthermore, the channel path 2a between said wall regions $4a^I$ has, at its narrowest point in the axial direction, a width $B_2$ (FIG. 4) of 15% to 45%, in particular of at most 35%, of the width $B_1$ (FIG. 8) of the circumferential channel 2. In the region between the sickle-shaped wall sections 4b and the base elevations 7, the width of the channel path 2a is such that the base elevations 7, at the narrowest point of the channel path 2a, are at a distance $a_1$ (FIG. 8) in the axial direction of 2.0 mm to 4.0 mm from the sickle-shaped wall sections 4b.

Each base elevation 7 has, in the circumferential direction, a greatest extent length $l_1$ (FIG. 2) of 10.0 mm to 35.0 mm, in particular of 15.0 mm to 25.0 mm, which correlates to the distances of projections 6 which follow one another in the circumferential direction and are assigned in pairs to one another. In the radial direction, each base elevation 7 at its highest point in its central region has a height $h_1$ (FIG. 8) which amounts to 25% to 60%, in particular 30% to 55%, and, in a particularly preferred manner, at most 50%, of the respectively provided profile depth $T_1$. In the axial direction, each base elevation 7 has, at its widest point, a width $b_1$ (FIG. 2) of 5.0 mm to 15.0 mm.

According to FIG. 3, each base elevation 7 is composed of a base part 7a and a dome-like upper part 7b which is placed onto said base part. As FIG. 6 to FIG. 8 show, the base part 7a is of rectangular design in cross section and, in the radial direction, has a height $h_2$ which is determined from the channel base 5 and which corresponds to 35% to 80%, in particular 40% to 60%, of the height $h_1$ of the base elevation 7 (FIG. 8).

The dome-like upper part 7b is bounded in the radial direction by a top surface 8 (FIG. 8) which slopes uniformly downward from the height hi present at the highest point of the base elevation 7 to the height $h_2$ at the edges of the dome-like upper part 7b. As FIG. 2 and FIG. 3 in particular show, the top surface 8 is preferably formed by a plurality of flat partial top surfaces, nine in the exemplary embodiment shown.

FIG. 9a and FIG. 9b show a circumferential channel 2' which is a variant of the circumferential channel 2 and differs therefrom by channel edges 3' running in a wave-shaped manner in a plan view and by channel walls 4' which adjoin said channel edges and run in a wave-shaped manner in a plan view. The channel walls 4' preferably run at a constant angle of 5° to 30°, in particular of 10° to 20°, to the radial direction. The two channel edges 3' and the two channel walls 4' are formed symmetrically to one another in each case with respect to a plane defined by the circumferential direction and the radial direction, wherein the circumferential channel 2' at the tread periphery has a width $B_1'$ at its widest point and a width $B_2'$ at the narrowest point. The width $B_1'$ amounts to 10.0 mm to 25.0 mm, the width $B_2'$ amounts to 75% to 95% of the width $B_1'$. The channel walls 4' have wall sections 4'a which are curved concavely toward one another in a plan view and wall sections 4'b which are curved convexly toward one another in a plan view, in an alternating manner in the circumferential direction.

In each intermediate space which is located between opposite wall sections 4'b curved convexly toward one another, a base elevation 7' configured in a manner corresponding to the base elevation 7 of the first design variant (FIG. 1 to FIG. 8) is formed centrally on the channel base of the circumferential channel 2' and has a top surface 8' which, in the exemplary embodiment shown, contacts the channel walls 4' at their radially inner end regions (FIG. 9b). In a preferred manner, a channel path which encircles all of the base elevations 7' and is at a distance of 2.0 mm to 4.0 mm from the wall sections 4'b in the axial direction remains on the channel base of the circumferential channel 2'. Of the channel base of the circumferential channel 2', there remains a multiplicity of channel base regions 5' which run at a profile depth between mutually adjacent base elevations 7' and are in the manner of an elongated X in the circumferential direction in a plan view.

FIG. 10a and FIG. 10b show a circumferential channel 2" which is a further variant of the circumferential channel 2. The circumferential channel 2" differs from the circumferential channel 2 by base elevations 7" configured differently from the base elevations 7 thereof. The base elevations 7" are bounded in the radial direction by a top surface 8" which has a core top surface 8"a oriented parallel to the tread periphery and an edge top surface 8"b which encircles the latter and slopes downward toward the edge of the base elevation 7". In the radial direction, the base elevations 7" in the region of the core top surface 8"a have a height $h_3$ (FIG. 10c) which amounts to 25% to 60%, in particular 30% to 55%, and, in a particularly preferred manner, at most 50%, of the profile depth $T_1$. As FIG. 10c shows, the base elevations 7" are composed of a base part 7"a and an upper part 7"b which is placed onto the latter and is trapezoidal in cross section. The base part 7"a reaches in the radial direction as far as a height $h_4$, which corresponds to 35% to 90%, in particular 70% to 80%, of the height $h_3$ of the base elevation 7" (FIG. 8).

The invention is not limited to the embodiments described. The base elevations can be in a form differing from that described, in particular in the form of hemi-ellipsoids or in the form of subsections of hemi-ellipsoids. The channel walls of the circumferential channels can also be formed without the radially outer sections which are mentioned in conjunction with the first design variant (FIG. 4 to FIG. 8) and run in the radial direction.

LIST OF REFERENCE NUMERALS

1 . . . Profile positive
2, 2', 2" . . . Circumferential channel
2a . . . Channel path
3, 3' . . . Channel edge 4, 4' . . . Channel wall
4a, 4'a . . . Wall section
$4a^I$, $4a^{II}$ . . . Wall region
4b, 4'b . . . Wall section
4c . . . Connecting surface
5 . . . Channel base
5' . . . Channel base region
6 . . . Projection
7, 7', 7" . . . Base elevation
7a, 7"a . . . Base part
7b, 7"b . . . Upper part
8, 8', 8" . . . Top surface
8"a . . . Core top surface
   8"b . . . Edge top surface
$a_1$ . . . Distance
$b_1$ . . . Width
$B_1$, $B_2$ . . . Width
$B_1'$, $B_2'$ . . . Width
$l_1$ . . . Extent length
$h_1$, $h_2$, $h_3$, $h_4$ . . . Height
$T_1$ . . . Profile depth
$T_2$ . . . Depth
α, β . . . angle

The invention claimed is:

1. A vehicle tire comprising: a tread having a circumferential channel with a channel base and channel walls and having a tread depth; base elevations formed on the channel base as stone ejectors; the base elevations each comprise an upper part and a base part, the upper part having a top surface and the base part having a base surface; the base elevations having a maximum height at a top of the upper part of 25% to 60% of the tread depth in a radial direction, the top surface connects with the base surface at an encircling surface edge of the base elevation, the top surface having a plurality of planed surfaces that slope downwardly uniformly to the encircling surface edge to distribute forces from stones; the base surface connects with the encircling surface edge and is substantially vertical in the radial direction; the base elevations are at distances of greater than zero and up to 4.0 mm from the channel walls, wall sections of the channel walls adjacent to the base elevations have a downward slope and converge toward each other, and the wall sections have a concave curvature in plan view that opens toward the base elevations, the downward slope and the concave curvature of the wall sections being at least over a majority of a radial extent of the wall sections as viewed in cross-section of the circumferential channel; the encircling surface edge follows the concave curvature of the wall sections so that an axial width of the base elevations, as viewed in plan view, decreases toward circumferential ends of the base elevations corresponding to the concave curvature of the wall sections, and the base elevations are elongated to have a greater extent in the circumferential direction than in the axial direction; wherein the base elevations are elongated along a circumferential centerline of the channel, and the plurality of planed surfaces include a first plurality of planed surfaces on one side of the centerline, and a second plurality of planed surfaces on an opposite side of the centerline; and wherein the first plurality of planed surfaces and the second plurality of planed surfaces are angled obliquely relative to the circumferential centerline.

2. The tire of claim 1, the base elevations each having an elongated diamond shape with rounded corners.

3. The tire of claim 2, the base part having a constant height at the encircling surface edge.

4. The tire of claim 3, the base part having a height from 35% to 90% of the maximum height of the base elevations.

5. The tire of claim 1, the upper part having a dome shape in which the top surface of the upper part forms a central ridge extending along a circumferential centerline of the channel, the central ridge having a first portion that slopes downwardly in a first circumferential direction, and having a second portion that slopes downwardly in a second circumferential direction that is opposite the first circumferential direction, wherein the first portion and the second portion together constitute a majority of the circumferential extent of the central ridge.

6. The tire of claim 1, further comprising a groove path of the circumferential channel that runs between the wall sections and the base elevations, wherein the groove path narrows as it runs from a first position adjacent to a first circumferential end of each base elevation to a second position adjacent an axially widest part of each base elevation, and the groove path widens as it runs from the second position to a third position adjacent to a second circumferential end of each base elevation, and wherein a narrowest point of the groove path has a width of 15% to 45% the width of the circumferential channel.

7. The tire of claim 1, the channel walls defining opposite sides of the channel are identical symmetrical mirror images of each other with respect to a plane defined by the circumferential direction.

8. The tire of claim 7, the channel walls further comprising a plurality of flat lug like projections arranged between wall sections at regular intervals over the entire extent of the circumferential channel, the flat lug like projections each sloping downwardly along a majority of a radial extent of the flat lug like projection as viewed in cross-section of the circumferential channel.

9. The tire of claim 8,
the channel walls further comprising lateral wall regions between the flat lug like projections and the wall sections, the lateral wall regions having flat surfaces as viewed in cross-section of the circumferential channel and being sloped downwardly, wherein the downward slope of the flat lug like projections is at a different angle than the downward slope of the lateral wall regions, and
the wall sections adjacent the base elevations having a curved surface as viewed in cross- section of the circumferential channel and having a sickle-shape as viewed in plan view.

10. The tire of claim 9,
wherein the downward slope of the flat lug like projections has an angle in a range from 10-degrees to 30-degrees relative to the radial direction,
wherein the downward slope of the lateral wail regions has an angle in a range from 5-degrees to 25-degrees relative to the radial direction, and
wherein the downward slope of the lateral wall regions is less than the downward slope of the fiat lug like projections.

11. The tire of claim 1, wherein: a first planed surface of the first plurality of planed surfaces is oriented obliquely to face both in a first circumferential direction of the tire and a first axial direction of the tire, a second planed surface of the first plurality of planed surfaces is oriented obliquely to face both in a second circumferential direction of the tire and the first axial direction of the tire, a third planed surface of the second plurality of planed surfaces is oriented obliquely to face both in the first circumferential direction of the tire and a second axial direction of the tire, and a fourth planed surface of the second plurality of planed surfaces is oriented obliquely to face both in the second circumferential direction of the tire and the second axial direction of the tire.

12. The tire of claim 1, wherein the channel walls on opposite sides of the circumferential channel are each defined by the wall sections and wail regions arranged between the wall sections at regular intervals over an entire circumferential extent of the circumferential channel, and wherein an entirety of each channel wall is bounded continuously and uninterruptedly over the entire circumferential extent of the circumferential channel.

13. The tire of The tire of further comprising a groove path of the circumferential channel that runs between the wall sections and the base elevations, wherein the groove path narrows as it runs from a first position adjacent to a first circumferential end of each base elevation to a second position adjacent an axially widest part of each base elevation, and the groove path widens as it runs from the second position to a third position adjacent to a second circumferential end of each base elevation; wherein the channel walls on opposite sides of the circumferential channel are each defined by the wall sections and wall regions arranged between the wall sections at regular intervals over an entire circumferential extent of the circumferential channel, and wherein an entirety of each channel wall extends continuously and uninterruptedly over the entire circumferential extent of the circumferential channel; wherein the channel walls defining opposite sides of the circumferential channel are identical symmetrical mirror images of each other with respect to a plane defined by the circumferential direction; and wherein: a first planed surface of the first plurality of planed surfaces is oriented obliquely to face both in a first circumferential direction of the tire and a first axial direction of the tire, a second planed surface of the first plurality of planed surfaces is oriented obliquely to face both in a second circumferential direction of the tire and the first axial direction of the tire, a third planed surface of the second plurality of planed surfaces is oriented obliquely to face both in the first circumferential direction of the tire and a second axial direction of the tire, and a fourth planed surface of the second plurality of planed surfaces is oriented obliquely to face both in the second circumferential direction of the tire and the second axial direction of the tire.

* * * * *